United States Patent
Granger

[45] Apr. 29, 1975
[11] 3,879,923

[54] CITRUS RAKE

[76] Inventor: Charles C. Granger, 1203 Chestnut St., Henderson, N.C. 27536

[22] Filed: Nov. 8, 1973

[21] Appl. No.: 414,138

[52] U.S. Cl. ............................. 56/328; 56/376
[51] Int. Cl. ................... A01g 19/00; A01d 77/06
[58] Field of Search ............ 56/328, 376, 377, 1, 6, 56/DIG. 21, 10.4, 10.7, 10.9, 15.3, 15.7, 7, 229

[56] References Cited
UNITED STATES PATENTS

| 532,079 | 1/1895 | Mathwich | 56/376 |
|---|---|---|---|
| 1,406,506 | 2/1922 | Stansberry | 56/376 |
| 2,511,100 | 6/1950 | Clark | 56/376 |
| 2,669,826 | 2/1954 | Watrous | 56/13.4 |
| 2,775,090 | 12/1956 | Huffman | 56/376 |
| 3,074,222 | 1/1963 | Cunningham | 56/376 |
| 3,113,411 | 12/1963 | Hall | 56/15.7 |
| 3,415,043 | 12/1968 | Shones | 56/6 X |
| 3,667,200 | 6/1972 | Pool et al. | 56/328 R |
| 3,762,140 | 10/1973 | Block | 56/328 R |
| 3,797,210 | 3/1974 | Turner | 56/15.8 |

FOREIGN PATENTS OR APPLICATIONS

| 1,527,593 | 4/1968 | France | 56/376 |
|---|---|---|---|
| 1,453,929 | 8/1966 | France | 56/376 |

*Primary Examiner*—Russell R. Kinsey
*Attorney, Agent, or Firm*—Clarence A. O'Brien; Harvey B. Jacobson

[57] ABSTRACT

A support arm is provided for support from a vehicle with the support arm projecting horizontally outwardly from one side of the vehicle and mounted, at its base end, from the vehicle for swinging about an axis extending transversely of the support arm and longitudinally of the vehicle toward a position with the support arm disposed upright. A plurality of horizontally disposed conveyor assemblies extend longitudinally of the support arm in end overlapped laterally spaced relation and each of the conveyor members is structured to engage fruit disposed on the ground and to convey the engaged fruit inwardly toward the centerline of movement of the associated vehicle. Further, the conveyor member supported from the outer end portion of the support arm is mounted from an extendable and retractable outer end portion of the support arm and each of the conveyor assemblies is mounted on the free end of a trailing mounting arm pivotally supported from the support arm at its forward end for rotation about an axis extending longitudinally of the support arm, each of the mounting arms being swingable between a generally horizontally disposed rearwardly projecting position and an inclined position with the rear end thereof inclined upwardly and there being provided counterbalanced spring means for counterbalancing a majority of the weight of each conveyor member and the associated mounting arm and ground-engaging skids or slides carried by each conveyor member support structure whereby the conveyor members may glide over the ground from which fruit is to be gathered. Also, the inner end of the support arm is swingable to a position with the support arm disposed upright relative to a base which is in turn oscillatably supported from a mounting structure for oscillation about an upstanding axis, the mounting structure in turn being supported from a mount for vertical adjustment relative thereto. The mount is in turn to be stationarily supported from an associated vehicle.

13 Claims, 7 Drawing Figures

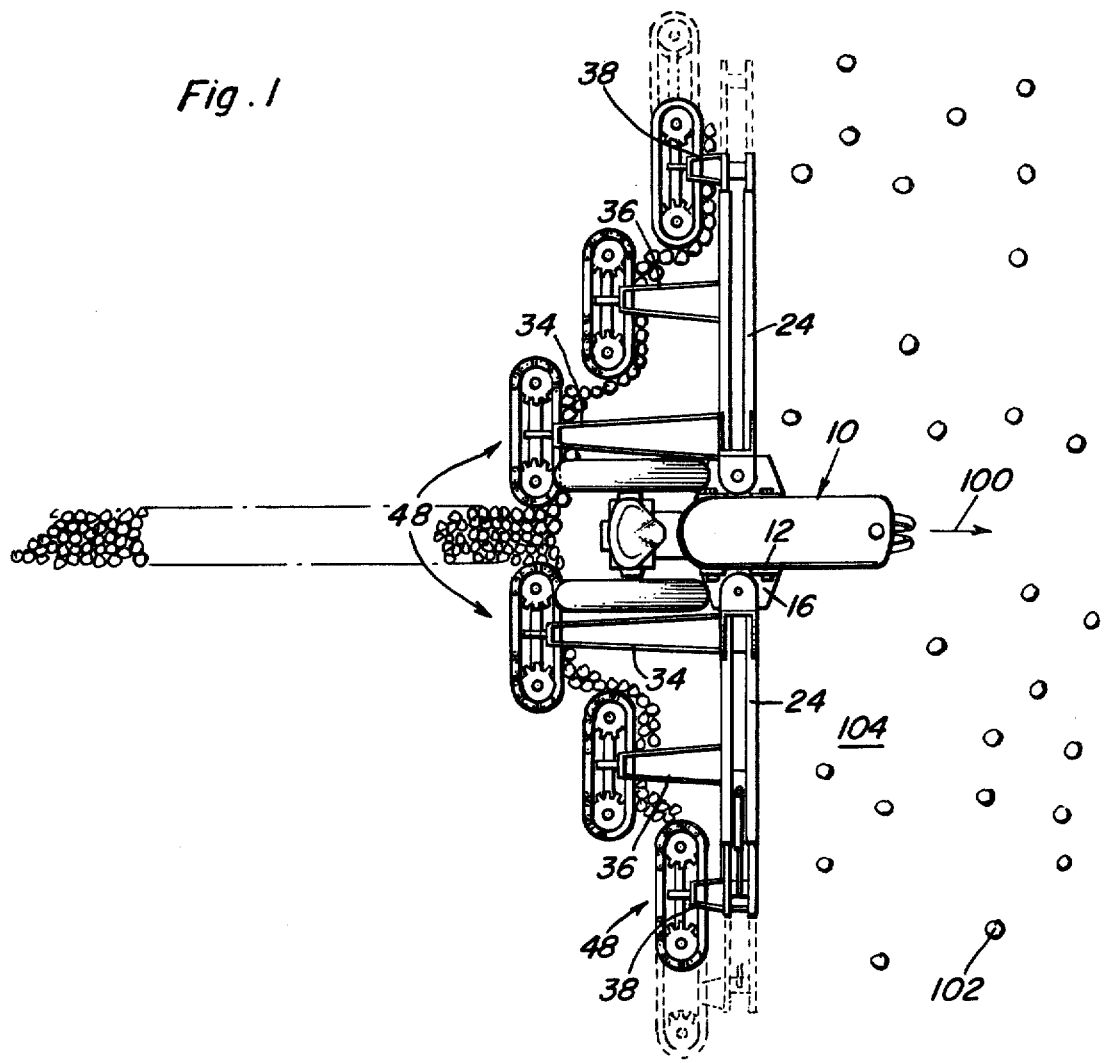
Fig. 1
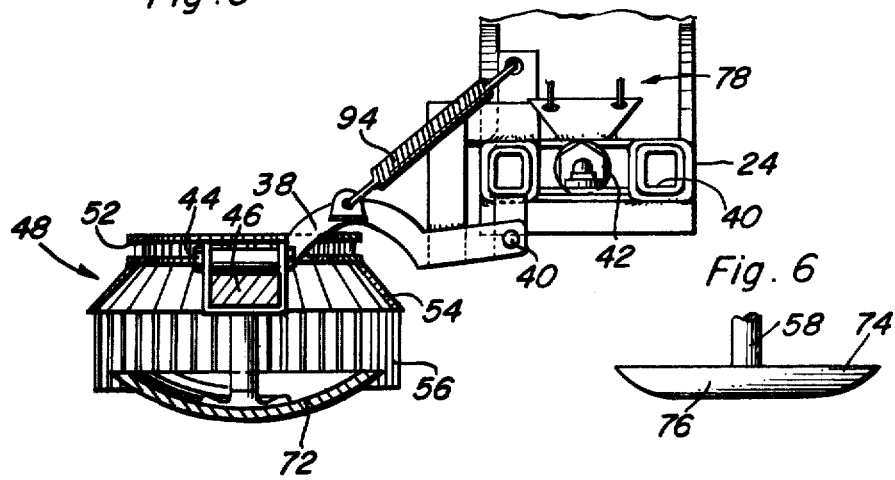
Fig. 5
Fig. 6

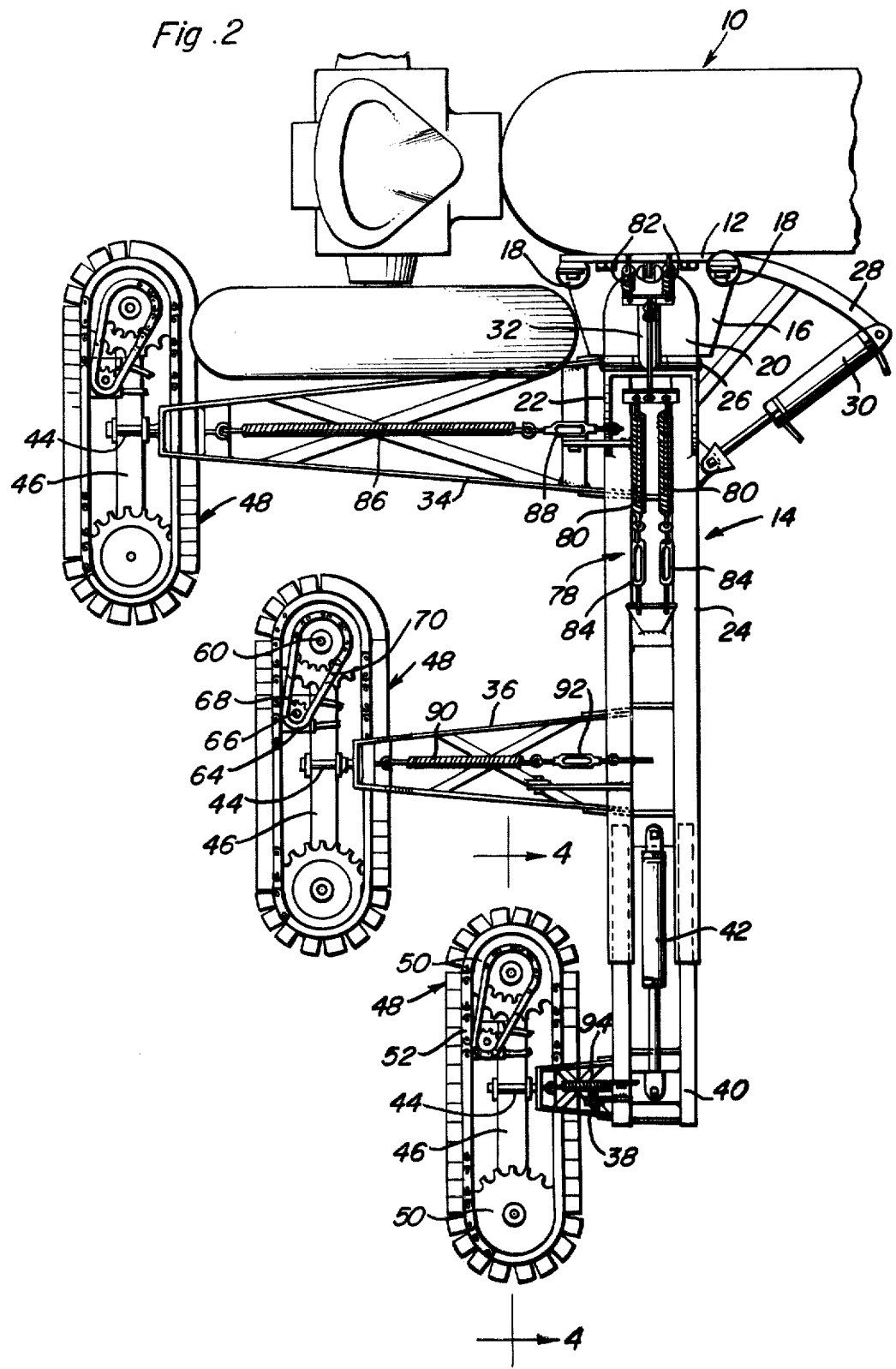

CITRUS RAKE

Heretofore various types of windrowing machines have been provided for windrowing cut hay. However, much citrus fruit drops to the ground before the majority of the fruit on a tree is sufficiently ripe for picking and such fallen fruit should be picked from the ground without excessive delay in order to prevent spoilage of the fruit. In order to provide an apparatus by which fallen citrus fruit may be gathered and windrowed for ease in collection from the ground there has been envisioned that horizontal conveyor members primarily designed as hay rakes and such as those disclosed in U.S. Pat. No. 532,079, dated Jan. 8, 1895, and U.S. Pat. No. 1,406,506, dated Feb. 14, 1922, could be modified in order to be capable of efficiently windrowing fallen citrus fruit. Accordingly, the general concept of horizontally disposed endless conveyor assemblies including depending tines or picking elements has been adopted in the instant invention. However, although horizontal conveyor assemblies have heretofore been supported from associated vehicles for angular displacement about upstanding axes as well as horizontal axes extending longitudinally of the associated vehicle, in order to be as efficient as possible a similar apparatus for use in windrowing citrus fruit must be capable of additional adjustments to facilitate the movement of such a windrow apparatus between the rows of citrus trees. Accordingly, the citrus fruit windrowing rake of the instant invention includes a support arm for projecting horizontally outwardly from one side of an associated vehicle and from which a plurality of horizontally disposed conveyor members or assemblies which extend longitudinally of the support arm are supported in end overlapped and laterally spaced relation. Further, the outermost conveyor member or assembly is supported from an extendable and retractable outer end portion of the support arm thereby enabling the outermost conveyor member or assembly to be extended so as to move between trees in a row of trees and retracted to pass inwardly of each tree of an associated row of trees. Still further, although a field in which hay is grown may be generally flat, the ground surface in a citrus grove is often irregular due to previous cultivation and irrigation. Accordingly, the citrus fruit windrowing rake of the instant invention is constructed in a manner whereby each of the support arm mounted citrus fruit windrowing conveyors is supported from the support arm by means of a trailing mounting arm swingable in a vertical plane. Also, each of the mounting arms is provided with a counterbalance spring and each of the conveyor members or assemblies includes ground-engaging skids in order to enable each conveyor member or assembly to lightly glide over the ground in predetermined spaced relation relative thereto even though the ground surface may be irregular. Still further, citrus fruits grow in different sizes and each support arm is therefore supported not only for rotation about an upstanding axis as well as rotation about an axis extending longitudinally of the associated vehicle but also for vertical shifting along the aforementioned upstanding axis, whereby the spacing of the citrus fruit engaging members of the conveyor members or assemblies above the ground may be varied according to the citrus fruit to be windrowed.

The main object of this invention is to provide a citrus fruit windrowing rake which will be capable of windrowing citrus fruit which has prematurely fallen from citrus trees.

Another object of this invention, in accordance with the immediately preceding object, is to provide a citrus rake which will be capable of windrowing different size citrus fruit lying on the ground.

Still another object is to provide a citrus fruit windrowing rake for support from an associated vehicle and which may be varied in overall width so as to be adapted to move down between the rows of citrus trees spaced different distances apart.

A further object of this invention is to provide a citrus fruit windrowing rake for support from an associated vehicle and constructed in a manner whereby the outer end portions of the support arms of the rake from which the outermost conveyor members are supported may be extended and retracted to thereby enable the rake assembly to be extended between adjacent trees in a row of trees.

Yet another object of this invention is to provide a citrus fruit windrowing rake in accordance with the preceding objects and including elongated laterally outwardly projecting opposite side support arms from which a plurality of spring counterbalanced and vertically shiftable windrowing conveyors are supported including ground-engaging skids so that the windrowing conveyors may glide over uneven terrain.

A final object of this invention to be specifically enumerated herein is to provide a citrus fruit windrowing rake for support from an associated vehicle and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a top plan view illustrating the citrus fruit windrowing rake structure of the instant invention supported from the opposite sides of a tractor;

FIG. 2 is an enlarged fragmentary top plan view of the left hand portion of the assemblage illustrated in FIG. 1;

FIG. 5 is an enlarged fragmentary end elevational view as seen from the left hand side of FIG. 3 and with the outermost conveyor assembly illustrated in longitudinal vertical section;

FIG. 6 is a fragmentary side elevational view of a modified form of conveyor assembly ground skid.

Figure 3:
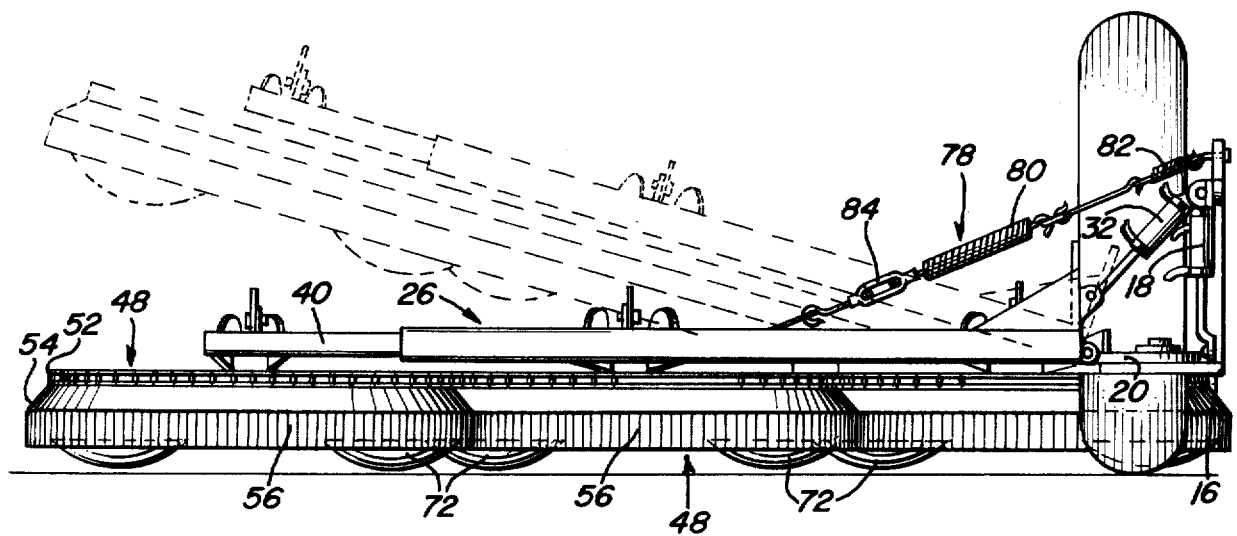
FIG. 3 is a fragmentary front elevational view of the assemblage illustrated in FIG. 2.
Figure 4:
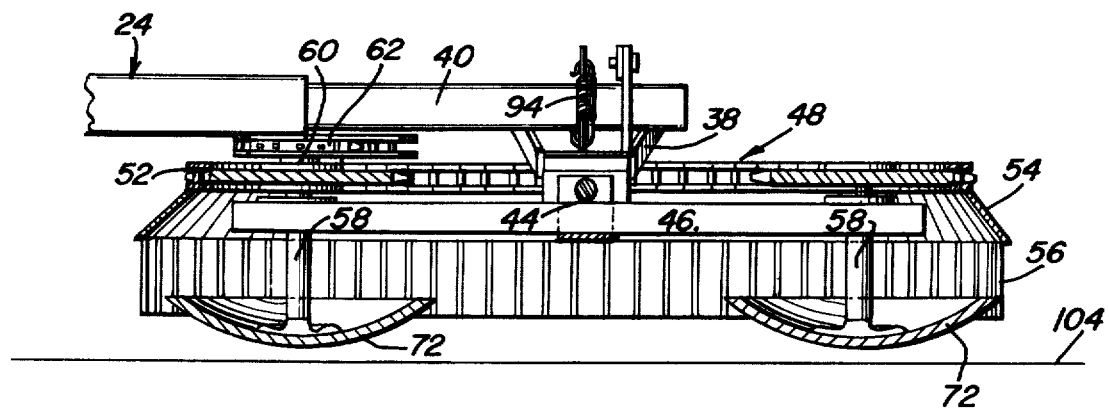
FIG. 4 is an enlarged fragmentary vertical sectional view taken substantially upon the plane indicated by the section line 4—4 of FIG. 2.

Referring now more specifically to the drawings, the numeral 10 generally designates a conventional form of farm tractor including opposite side portions to which a pair of mounts 12 are secured. The mounts 12 comprise portions of a citrus windrowing rake assembly referred to in general by the reference numeral 14.

The citrus windrowing rake assembly further includes mounting structure 16 guidingly supported from each mount 12 for vertical shifting relative thereto and a pair of fluid motors or cylinders 18 connected between each mount 12 and mounting structure 16 for vertically shifting the latter relative to the associated mount. Also, the assembly 14 is provided with a turntable 20 rotatably supported from each mounting structure 16 for oscillation about an upstanding axis and each turntable 20 has the base end 22 of an elongated support arm 24 pivotally secured thereto as at 26 for rotation about an axis extending transversely of the base end of the arm 24 and longitudinally of the tractor 10.

Each mounting structure 16 includes an anchor arm 28 supported therefrom and a fluid cylinder or motor 30 is connected between the free end of each anchor arm 28 and the associated support arm 24 adjcent its base end 22 whereby each support arm 24 and the associated turntable 20 may be angularly displaced about the axis of rotation of the turntable 20 relative to its mounting structure 16. Further, an additional fluid motor or cylinder 32 is connected between an upper portion of each mounting structure 16 and the base end portion 22 of the corresponding support arm 24 for adjustably angularly displacing the support arms 24 about their horizontal axis of oscillation relative to the corresponding turntables 20.

Each support arm 24 includes three progressively shorter trailing arm assemblies 34, 36 and 38 which are spaced longitudinally of the corresponding support arm 24 and supported from the latter, as at 40, for oscillation in a vertical plane extending transversely of the corresponding support arm and longitudinally of the tractor 10. The trailing arm assembly 34 is carried by the base end portion of the support arm 24, the trailing arm assembly 36 is carried by an intermediate portion of the support arm 24 and the support arm 38 is carried by a telescopically supported extendable and retractable outer end portion 40 of the support arm 24, a fluid motor or cylinder 42 being operatively connected between the retractable and extendable outer end portion 40 of each support arm 24 and the non-extendable portion of the support arm 24. In this manner, the outer end portion 40 of each support arm 24 may be extended and retracted as desired.

The rear end of each trailing arm assembly 34, 36 and 38 includes a rearwardly projecting pivot shaft 44 from which the centrally intermediate portion of an elongated frame member 46 is oscillatably supported. Each frame member 46 comprises a main frame member of a conveyor assembly referred to in general by the reference numeral 48 and each conveyor assembly 48 includes a pair of opposite end sprocket wheels 50 journaled from the corresponding ends of the associated frame member 46 for rotation about upstanding axes. In addition, each conveyor assembly 48 includes an endless chain 52 trained about the corresponding sprocket wheels and each endless chain 52 includes longitudinally spaced downwardly and outwardly inclined support members 54 from which pairs of depending raking tines 56 are supported.

The sprocket wheels 50 are each mounted on upstanding shafts 58 journaled through the corresponding frame member 46 with the sprocket wheels 50 mounted on the upper ends of the shafts 58 projecting above the frame members 46. Further, the inboard shaft 58 of each conveyor assembly 48 includes an upward extension 60 upon which a drive input sprocket 62 is mounted and a hydraulic motor 64 is supported from the inboard end portion of each frame member 46 and includes an output shaft 66 upon which a drive sprocket wheel 68 is mounted. An endless chain 70 is trained about each drive sprocket wheel 68 and the corresponding drive input socket 62.

The lower ends of the shafts 58 include donwwardly convex dished skid members 72. The skid members 72 are partial spherical. However, as may be seen in FIG. 5 of the drawings, the skid members 72 may be replaced by similar dished skid members 74 including flat central undersurface portions 76.

A counterbalancing assembly referred to in general by the reference numeral 78 and including two pairs of expansion springs 80 and 82 and a pair of turnbuckles 84 is connected between an upper portion of the vertically adjustable mounting structure 18 and the corresponding support arm 24 at a point spaced outward of the base end 22 of the support arm 24. The assembly 78 effectively counterbalances substantially all of the cantilevered weight of the support arm 24, the trailing arm assemblies 34, 36 and 38 and the conveyor assemblies 48. In addition, a counterbalancing expansion spring 86 and turnbuckle 88 are connected between the rear end of the trailing arm assembly 34 and the base end portion of the support arm 24 so as to counterbalance the cantilevered weight of the trailing arm assembly 34 and the associated conveyor assembly 48 and an expansion spring 90 and associated turnbuckle 92 are connected between the rear end portion of the trailing arm assembly 36 and the support arm 24 to counterbalance the cantilever weight of the trailing arm 36 and its associated conveyor assembly 48. Further, expansion spring 94 is connected between the rear end of the trailing arm assembly 38 and the extendable and retractable outer end portion 40 of the support arm 24 to counterbalance the cantilever weight of the trailing arm assembly 38 and its conveyor assembly 48.

Of course, the various fluid motors 18, 30, 32, 42 and the fluid or hydraulic motors 64 of the conveyor assemblies 48 may be actuated from the hydraulic system (not shown) of the vehicle 10.

In operation, as the vehicle 10 is moved forwardly in the direction of the arrow 100 in FIG. 1 the citrus fruit 102 lying on the ground 104 is engaged by the conveyor assemblies 48 and urged inwardly toward the center line of the path of the vehicle 100. As the citrus fruit engaged by the outermost conveyor assemblies moves off the inner ends thereof it is picked up by the outer ends of the intermediate conveyor assemblies and thereafter discharged from the inner ends of the intermediate conveyor assemblies and picked up by the outer ends of the inner conveyor assemblies 48 for subsequent discharge from the adjacent inner ends of the inner conveyor assemblies 48 in a windrow of citrus fruit behind the vehicle 10. As the vehicle 10 moves downwardly between rows of citrus trees, the outer end portions 40 of the support arms 24 may be extended and retracted to enable the outer ends of the outermost conveyor assemblies 48 to pass inwardly between the trees of the rows of trees between which the vehicle 10 is moving. After each tree is passed the corresponding outer end portion 40 is extended so that the corresponding conveyor assembly 48 may travel between adjacent trees of each row of trees. Further, due to the counterbalance assemblies 78 and the counterbalancing springs 86, 90 and 94 as well as the pivotal connections between the main longitudinal frame members 46 of the conveyor assemblies 48 and the pivot shafts 44, the conveyor assemblies 48, which include the skid members 72 or the skid members 76 at opposite ends thereof, may lightly glide over the ground 104 and conform to irregular ground surfaces during operation of the conveyor assemblies 48.

Further, if the spacing between adjacent rows of citrus trees is less than that which will enable the vehicle 10 to pass down between adjacent rows of citrus trees with the support arm 44 disposed at right angles to the path of movement of the vehicle 10 and the outer end portions 40 fully retracted, the fluid motors 30 may be operated to swing the outer ends of the support arms 24 forwardly so as to thereby reduce the overall width of the assembly illustrated in FIG. 1. Also, in the event one of the support arms 24 must traverse a slope, the corresponding fluid motor 32 may be actuated in order to incline that support arm 24. Still further, in the event the assemblage illustrated in FIG. 1 is operating in a terraced citrus grove or the assembly illustrated in FIG. 1 is to be used in windrowing large citrus fruit such as grapefruits instead of smaller citrus fruits such as lemons, the fluid motors 18 may be actuated to raise the vertically shiftable mounting structures 16 relative to the mounts 12.

Figure 7:
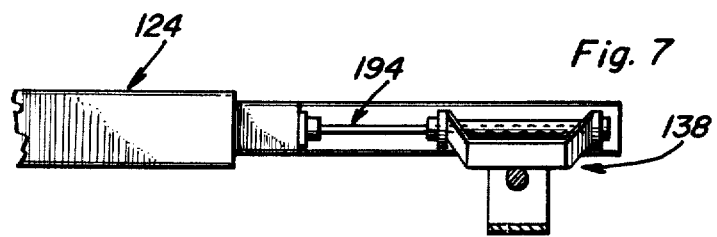
FIG. 7 is a fragmentary vertical sectional view similar to FIG. 4, but with the conveyor assembly removed and illustrating a modified form of torsion bar biased conveyor assembly arm mounting.

With attention now invited to FIG. 7 there may be seen a modified form of support arm 124 similar to the arm 24 and which pivotally supports a trailing arm assembly 138 similar to assembly 38, but which incorporates a torsion bar assembly 194 connected between the arm 124 and the arm assembly 138 to counterbalance the weight of the free rear end of the arm assembly 138 and the conveyor assembly to be supported therefrom in lieu of an expansion spring such as spring 94. Of course, arm assemblies corresponding to arm assemblies 34 and 36 may also be provided with torsion bar counterbalancing means in lieu of the expansion springs 86 and 90.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a mobile vehicle for movement in a first direction, a support arm including a base end and a free end, support means supporting the base end of said support arm from said vehicle with the outer free end of said arm projecting outwardly of one side of said vehicle transverse to said direction, an elongated horizontal conveyor assembly, mounting means supporting said conveyor assembly from said arm with said conveyor assembly extending longitudinally of said arm, said conveyor assembly including depending fruit engaging means supported therefrom adapted to engage fruit lying on the ground over which said arm is moved and to convey the engaged fruit along the ground toward the center of the path of movement of said vehicle, said mounting means including means supporting a longitidinal central portion of said conveyor assembly for oscillation about a horizontal axis extending transversely of said conveyor assembly and said support arm, and also means supporting said longitudinal central portion of said conveyor assembly from said arm for floating vertical shifting relative to said arm, said conveyor assembly including dependingly support opposite end ground engageable support means adapted to engage the ground and vertically and oscillatably shift said conveyor assembly according to irregular ground surfaces over which said ground engageable support means may be moved.

2. The combination of claim 1 wherein said support means includes a mounting structure vertically adjustable relative to said vehicle, a turntable pivotally supported from said mounting structure for angular displacement about an upstanding axis, and means pivotally supporting the base end of said arm from said turntable for oscillation about a horizontal axis extending transversely of the base end of said support arm.

3. In combination, a mobile vehicle, a support arm including a base end and a free end, support means supporting the base end of said support arm from said vehicle with the outer free end of said arm projecting outwardly of one side of said vehicle, an elongated horizontal conveyor assembly, mounting means supporting said conveyor assembly from said arm with said conveyor assembly extending longitudinally of said arm, said conveyor assembly including depending fruit engaging means supported therefrom adapted to engage fruit lying on the ground over which said arm assembly is moved and to convey the engaged fruit along the ground toward the center of the path of movement of said vehicle, said support means including a mounting structure vertically adjustable relative to said vehicle, a turntable pivotally supported from said mounting structure for angular displacement about an upstanding axis, and means pivotally supporting the base end of said arm from said turntable for oscillation about a horizontal axis extending transversely of the base end of said support arm, said mounting means including means supporting said conveyor assembly from said arm for floating vertical shifting relative to said arm, said conveyor assembly including dependingly supported ground engageable support means adapted to engage the ground and vertically shift said conveyor assembly according to irregular ground surfaces over which said ground engageable support means may be moved, said mounting means including means supporting said conveyor assembly, intermediate its opposite ends, for oscillation about a horizontal axis extending transversely of said conveyor assembly and said support arm.

4. The combination of claim 3 wherein said mounting means includes means supporting said conveyor assembly for said arm for floating vertical shifting relative to said arm, said conveyor assembly including dependingly supported ground engageable support means adapted to engage the ground and vertically shift said conveyor assembly according to irregular ground surfaces over which said ground engageable support means may be moved.

5. In combination, a mobile vehicle, a support arm including a base end and a free end, support means supporting the base end of said support arm from said vehicle with the outer free end of said arm projecting outwardly of one side of said vehicle, an elongated horizontal conveyor assembly, mounting means supporting said conveyor assembly from said arm with said conveyor assembly extending longitudinally of said arm, said conveyor assembly including depending fruit engaging means supported therefrom adapted to engage fruit lying on the ground over which said arm assembly is moved and to convey the engaged fruit along the ground toward the center of the path of movement of said vehicle, the outer free end portion of said support arm being supported from the remainder of said support arm for lengthwise extension and retraction relative thereto, and an additional conveyor assembly remote from said base end of said arm supported from said outer free end portion of said arm, the first mentioned conveyor assembly being supported from said remainder of said support arm.

6. The combination of claim 5 wherein said mounting means includes means supporting said conveyor assemblies from said arm for floating vertical shifting relative to said arm, each conveyor assembly including dependingly supported ground engageable support means adapted to engage the ground and vertically shift said conveyor assemblies according to irregular ground surfaces over which said ground engageable support means may be moved.

7. The combination of claim 5 wherein said mounting means includes means supporting said conveyor assemblies, intermediate their opposite ends, for oscillation about horizontal axes extending transversely of said conveyor assemblies and said support arm.

8. The combination of claim 7 wherein said mounting means includes means supporting said conveyor assemblies from said arm for floating vertical shifting relative to said arm, each conveyor assembly including dependingly supported ground engageable support means adapted to engage the ground and vertically shift said conveyor assemblies according to irregular ground surfaces over which said ground engageable support means may be moved.

9. The combination of claim 5 wherein said support means includes a mounting structure vertically adjustable relative to said vehicle, a turntable pivotally supported from said mounting structure for angular displacement about an upstanding axis, and means pivotally supporting the base end of said arm from said turntable for oscillation about a horizontal axis extending transversely of the base end of said support arm.

10. The combination of claim 1 wherein said ground engageable structures comprise depending rotated shaft ends having upwardly dished circular horizontal ground engaging members on the lower ends thereof.

11. The combination of claim 10 wherein the under surfaces of said ground engaging members are partial spherical.

12. The combination of claim 10 wherein the under surfaces of said ground engaging members include generally flat circular central portions and upwardly curving outer peripheral portions.

13. In combination, a mobile vehicle for movement in a first direction, a support arm including a base end and a free end, support means supporting the base end of said support arm from said vehicle with the outer free end of said arm projecting outwardly of one side of said vehicle transverse to said direction, a plurality of elongated conveyor assemblies, mounting means supporting said conveyor assemblies from said arm with the assemblies extending and spaced longitudinally of said arm and adjacent ends of said assemblies disposed in horizontally overlapped relation in fore-and-aft positions relative to said direction, said assemblies including depending fruit-engaging means supported therefrom adapted to engage fruit lying on the ground over which the arm is moved and to convey the engaged fruit along the ground in a direction paralleling the arm, said mounting means including means supporting longitudinal center portions of said conveyor assemblies from said support arm for independent oscillation about horizontal axes extending transversely of said conveyor assemblies and said support arm and also means supporting the longitudinal center portions of said conveyor assemblies from said arm for independent floating vertical shifting relative to said arm, said conveyor assemblies each including dependingly supported opposite end grouund engageable support means adapted to engage the ground and vertically and oscillatably shift the corresponding conveyor assembly relative to the support arm according to irregular ground surfaces over which the ground engaging support means may be moved.

* * * * *